Patented May 15, 1945

2,375,772

UNITED STATES PATENT OFFICE 2,375,772

STRONTIUM PEROXIDE AND METHOD OF MANUFACTURING SAME

Lynn H. Dawsey, Kenmore, and Hans A. Rudolph, Buffalo, N. Y., assignors to Buffalo Electro-Chemical Company, Inc., Tonawanda, N. Y.

No Drawing. Application June 23, 1943, Serial No. 491,920

7 Claims. (Cl. 52—23)

The present invention relates to the production of strontium peroxide of high density.

Strontium peroxide, as manufactured by the usual wet process by the action of hydrogen peroxide upon alkaline solutions of water soluble salts of strontium, produces the octahydrate of strontium peroxide, namely, $SrO_2.8H_2O$. The octahydrate is readily transformed into the anhydrous material by heating. However, the product thus produced is a light, fluffy powder of low density. The strontium peroxide thus resulting from dehydration of the octahydrate is unfit for pyrotechnical uses in fireworks, flares or tracer bullets. In such uses, where the product serves the double purpose of flame coloration as well as oxygen supply for combustion, a dry, dense product is absolutely essential since more strontium and more oxygen can be packed into the space provided for the charge. The density of strontium peroxide, as heretofore produced by wet methods, has ranged from 0.4 to 0.6 gram per cubic centimeter. Attempts to produce strontium peroxide of a higher density by wet methods have proved unavailing.

It is an object of the present invention to provide a wet method whereby strontium peroxide of high density, that is to say, a density approaching two, can be produced.

In accordance with the present invention, chemical reaction is induced between the soluble salt of strontium and a soluble peroxide under alkaline conditions. Any suitable soluble salt of strontium may be employed as the source of strontium ions although the nitrate and chloride are preferred. Any suitable alkali may be used as the effective alkali although sodium hydroxide, potassium hydroxide or ammonium hydroxide are preferred in the practice of the invention. The peroxide employed for inter-action with the soluble salt of strontium will generally be the commercial aqueous solution of hydrogen peroxide designated 100 volume hydrogen peroxide, which product contains about 27.2% $H_2O_2$ by weight. Under some special conditions, the alkali and the peroxide may be furnished by a single source as, for instance, the alkali metal peroxides.

In accordance with the present invention, and in contrast with prior procedures, the reaction between the peroxide of the soluble strontium salt is effected at relatively elevated temperatures under vigorous stirring. Means are provided for maintaining the reaction zone and mixture at a temperature of 50° C. to about 75° C. The precipitated strontium peroxide is removed from the reaction zone, still being maintained within the temperature range of 50° C. to 75° C., and freed of other products of the reaction as, for instance, by centrifuging or any other suitable method of separation. Last traces of other products of the reaction are removed by washing with distilled water containing hydrogen peroxide, the temperature of the washing solution being maintained at from 55° C. to about 95° C. Thereafter, the cake of strontium peroxide is moistened with a hot concentrated solution of strontium nitrate or other soluble strontium salt so that the final product contains from about 2% to 10% of strontium nitrate. The product is thereafter dried at a temperature of from about 120° C. to 150° C. and ground in a ball mill and passed through a 140 mesh sieve. The resultant product is dry, free-flowing, and possesses a density of 2.01 to 2.1.

The following specific examples are given by way of illustration only and are not to be deemed limitative of the invention.

Example 1

When the three solutions (a) 667 g. $Sr(NO_3)_2$ per liter flowing at the rate of 60 cc. per minute, (b) 300 g. $H_2O_2$ per liter flowing at the rate of 23 cc. per minute, and (c) 288 g. NaOH per liter flowing at the rate of 50 cc. per minute, were proportioned for a period of 10 minutes through a stainless steel reactor, of the milkshake type, having a liquid capacity of 150 cc. with agitator running, the liquid in the reactor being maintained at 30° C., a yield of 212 grams of strontium peroxide containing 89.4% $SrO_2$ was obtained after washing at ordinary temperatures and drying the product at 130° C. The yield of the product was practically quantitative, based upon the amount of caustic used. The material produced was a light, fluffy powder, with a bulking value of 0.63 gram per cc. volume. On attempting to obtain a fine powder by grinding in a ball mill, the product lost its free-flowing properties in 10 minutes and caked up on the sides of the grinding vessel without resulting in any substantial increase in density.

Example 2

When the three solutions: (a) 667 g. $Sr(NO_3)_2$ per liter flowing at the rate of 60 cc. per minute, (b) 300 g. $H_2O_2$ per liter flowing at the rate of 40 cc. per minute, and (c) 288 g. NaOH per liter flowing at the rate of 50 cc. per minute, were proportioned through the reactor, as in Example 1, for the same period of time, but with the difference that the liquid in the reactor was maintained at 60° C. instead of 30° C., a yield of 208 g. of strontium peroxide containing 96.5% SrO₂ was obtained after washing, at 60° C., and drying the product at 130° C. The yield of the product amounted to 96.8% of the theoretical, based upon the quantity of caustic used. The material produced was no longer a light fluffy powder, but consisted of small tan-colored crystals, the apparent density of which was determined as 1.60 grams per cc. volume. On attempting to obtain a fine powder through grinding in the ball mill for 20 minutes, it was possible to obtain a fine, free-flowing powder and the density had been increased to about 1.80 grams per cc. volume. Further grinding caused sticking to the sides of the grinding vessel. When an attempt was made to screen the product, it could not be made to pass a standard 140 mesh sieve due to agglomeration or sticking together of the fine particles.

*Example 3*

The method of addition of strontium nitrate and the novel result of bringing about a further increase in the density of the product is illustrated in the following example. When the formation of the strontium peroxide was carried out exactly in the same way as in Example 2, but after the washing in the centrifuge was completed, the moist cake was treated with 100 cc. of hot strontium nitrate solution (conc. 667 g. Sr(NO₃)₂ per liter), for the purpose of impregnating the cake, and the excess of this solution was whirled through the basket of the centrifuge, followed by removal and drying of the cake under otherwise the same conditions as in Example 2, a yield of 226 grams of dry product was obtained, testing 89% SrO₂, 5% Sr(OH)₂ and 6% Sr(NO₃)₂. After this material was ground for 20 minutes in the ball mill, a granular powder was obtained which was free-flowing, non-sticky, easily passed through a 140 mesh sieve, and showed a density of 2.10 grams per cc. of volume.

What is claimed is:

1. The process for manufacturing high density strontium peroxide which comprises reacting a soluble peroxide and a soluble strontium salt in an alkaline aqueous medium at temperatures between 50° C. and 75° C.

2. The process for manufacturing high density strontium peroxide which comprises reacting a soluble peroxide and a soluble strontium salt in an alkaline aqueous medium in the neighborhood of 60° C.

3. The process for manufacturing high density strontium peroxide which comprises reacting a soluble peroxide and a soluble strontium salt in an alkaline aqueous medium at temperatures between 50° C. and 75° C., thereafter removing and washing the precipitated strontium peroxide at temperatures above 50° C.

4. The process for manufacturing high density strontium peroxide in combination with a water soluble strontium salt which comprises reacting a soluble peroxide and a soluble strontium salt in an alkaline aqueous medium at temperatures between 50° C. and 75° C., thereafter removing the precipitated strontium peroxide, washing it with an aqueous solution of a soluble strontium salt and drying the so washed residue.

5. The process for manufacturing high density strontium peroxide in combination with a water soluble strontium salt which comprises reacting a soluble peroxide and a soluble strontium salt in an alkaline aqueous medium at temperatures between 50° C. and 75° C., thereafter removing the precipitated strontium peroxide, washing it with an aqueous solution of a soluble strontium salt while maintaining the temperature of the moist peroxide above 50° C. and drying the so washed residue.

6. Strontium peroxide in combination with a water soluble strontium salt having a density of about 2.0 to 2.1 grams per cc. and containing 2% to 10% of additive water soluble strontium salt.

7. Strontium peroxide in combination with strontium nitrate having a density of about 2.0 to 2.1 grams per cc. and containing 2% to 10% of additive strontium nitrate.

LYNN H. DAWSEY.
HANS A. RUDOLPH.